UNITED STATES PATENT OFFICE.

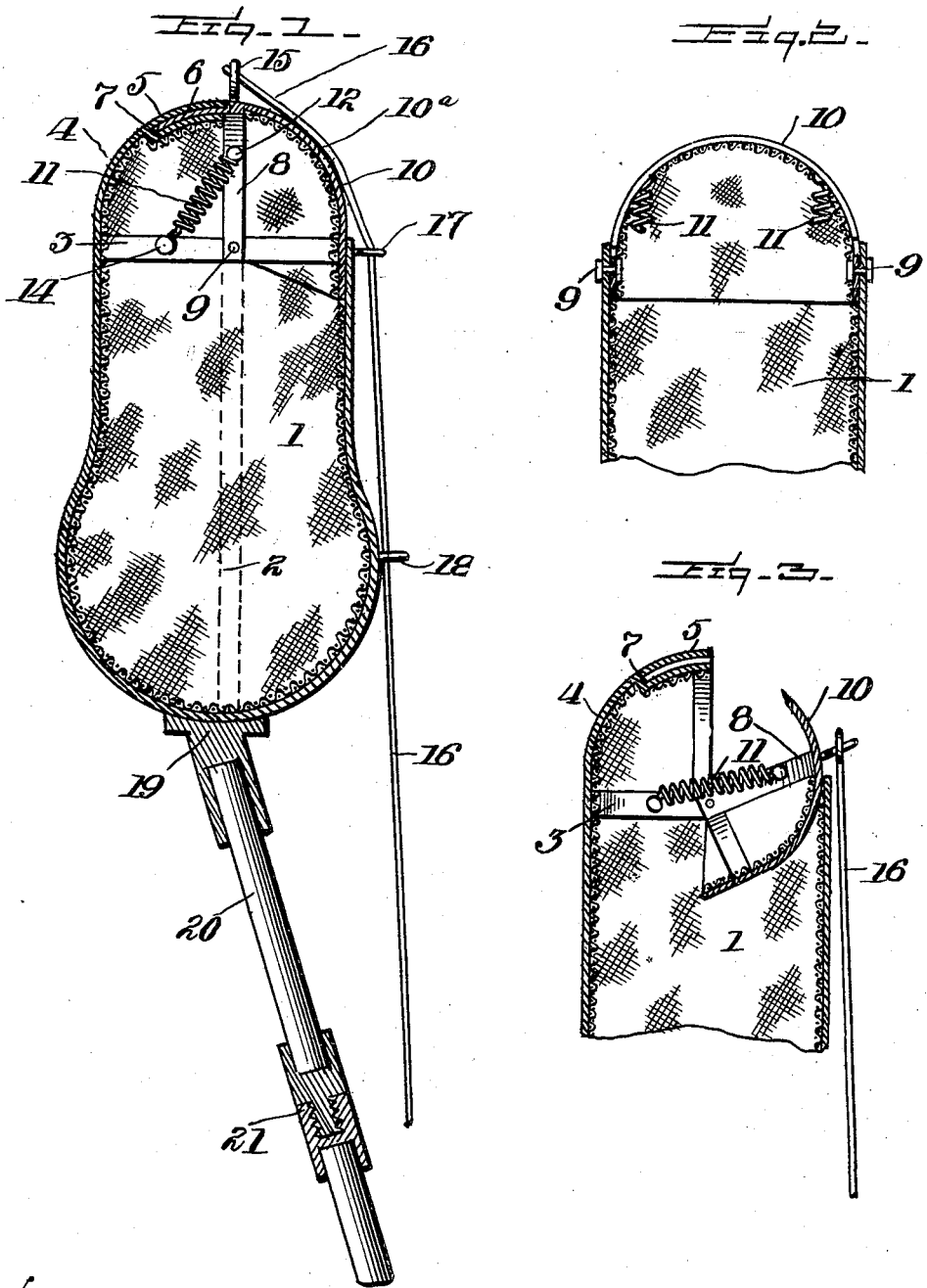

ISAAC DINGER, OF McKEES ROCKS, PENNSYLVANIA.

FRUIT-PICKING DEVICE.

SPECIFICATION forming part of Letters Patent No. 703,770, dated July 1, 1902.

Application filed February 24, 1902. Serial No. 95,177. (No model.)

*To all whom it may concern:*

Be it known that I, ISAAC DINGER, a citizen of the United States of America, residing at McKees Rocks, in the county of Allegheny and State of Pennsylvania, have invented certain new and useful Improvements in Fruit-Picking Devices, of which the following is a specification, reference being had therein to the accompanying drawings.

This invention relates to certain new and useful improvements in fruit-pickers, and has for its object the provision of novel means to provide a receptacle to receive the fruit, which is suspended to the end of a long pole or rod, said receptacle carrying a spring-actuated cutter that will effectually sever the fruit from the stem.

Another object of the present invention is to sever the fruit in such a manner that the same will be prevented from falling to the ground and receiving bruises by such fall that would injure the fruit to a great extent.

My invention further aims to provide a device of this class that will be extremely simple in construction, conveniently handled, and easily operated; furthermore, one that will be strong, durable, and comparatively inexpensive to manufacture.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a vertical sectional view of my improved fruit-picker, showing the same attached to the upper end of the pole or rod. Fig. 2 is a transverse vertical sectional view of the upper portion of the device. Fig. 3 is a similar view of Fig. 1, showing the lower portion of the device cut away and clearly illustrating the operation of my improved fruit-picker.

In the drawings the reference-numeral 1 represents a bag formed of any suitable material. This bag 1 is provided with suitable strengthening-ribs 2, forming a cage. A band 3 is secured to the interior of the bag near the upper portion thereof. The upper portion of the bag has formed therein an opening, and the material on the one side 4 is secured to one of the strengthening-ribs which is stationary, said strengthening-ribs having a guideway 5 formed therein adapted to receive a cutter 6, carrying a knife-edge 7. This cutter 6 is carried by the movable ribs 8, which are pivoted at 9 to the band 3. The upper end of the bag is provided with a separate piece of material 10, which is secured to the movable section $10^a$ and rib 8. Coil-springs 11 are secured at 12 to the rib 8 and at 14 to the band 3. The movable section 10 is also provided at its upper end with a loop 15 to receive the operating-cord 16, passing through eyes 17 18, carried by one of the ribs. This operating-cord 16 extends downwardly to the operator. A socket 19 is secured to the lower portion of the bag and strengthening-ribs to receive the pole or rod 20, said pole or rod 20 carrying a cable 21, which will permit the pole or rod to be formed in a number of sections in order to lengthen or shorten the pole to accommodate the height of the trees bearing the fruit.

The operation of my improved fruit-picker is as follows: The pole or rod is manipulated so as to bring the upper portion of the bag into contact with the fruit. The operating-cord is then drawn, thereby opening the movable section $10^a$ and rib 8, carrying the knife-edge. The device will then assume the position as illustrated in Fig. 3 of the drawings. The device is then adjusted in a manner to engage the stem of the fruit, and by releasing the operating-cord the springs 11 will contract, operating the knife or cutter, which will sever the fruit from the stem and allow it to drop into the bag or receptacle.

The many advantages obtained by the use of my improved picker will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a fruit-picker, the combination of a receptacle formed of strengthening-ribs, a band carried by said ribs extending in a transverse direction thereto, a movable section comprising ribs pivoted to the ends of said band with springs secured to said ribs and the band, a cutter carried by the movable ribs, one of said strengthening-ribs having a guideway formed therein adapted to receive said cutter, said movable section adapted to operate downwardly into the receptacle and carrying a loop at its front portion, and a cord engaging in said loop and over said movable section whereby the said section is actuated downwardly when the cord is operated, substantially as described.

In testimony whereof I affix my signature in the presence of two witnesses.

ISAAC DINGER.

Witnesses:
JOHN NOLAND,
E. E. POTTER.